Patented Dec. 5, 1933

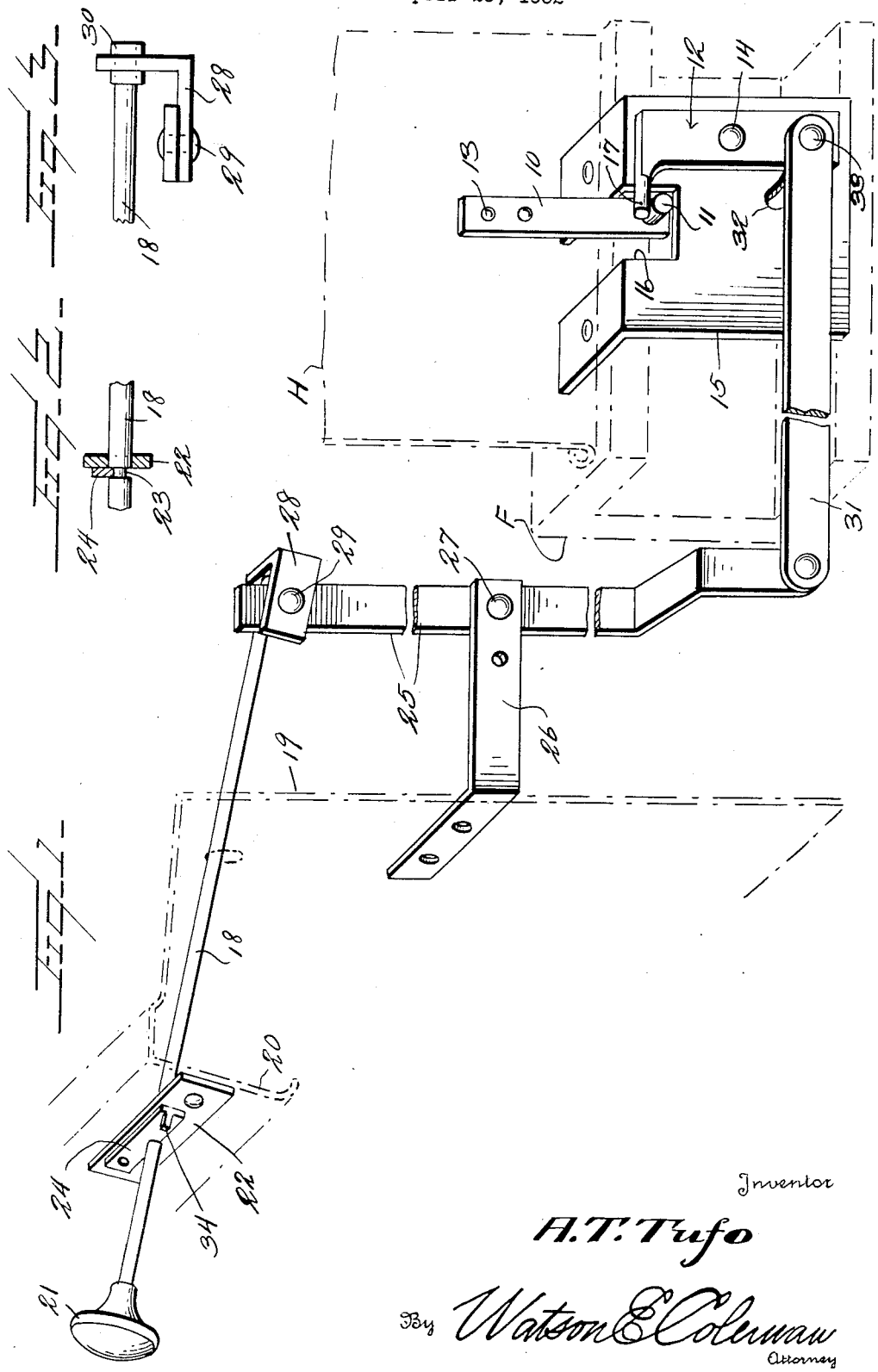

1,938,267

UNITED STATES PATENT OFFICE 1,938,267

VEHICLE HOOD LOCKING MEANS

Anthony T. Tufo, Carthage, N. Y.

Application April 23, 1932. Serial No. 607,181

1 Claim. (Cl. 292—196)

This invention relates to motor vehicles and more particularly to a locking means for the hood of a vehicle.

An object of this invention is to provide releasable locking means for a motor vehicle hood which is operable from the interior of the vehicle so that when the vehicle doors are locked, it will be impossible for an unauthorized person to lift up the hood of the vehicle.

Another object of this invention is to provide an exceedingly simple construction of this kind which embodies the use of only a relatively few parts which are operable from within the vehicle and which engage the central portion of the hood adjacent the bottom edge so as to prevent an unauthorized person from interfering with the engine or the component parts thereof.

The above and various other objects and advantages of this invention will in part be described in and in part be understood from the following detailed description of the present preferred embodiment, the same being illustrated in the accompanying drawing, wherein:—

Figure 1 is a detail perspective view partly broken away of a device constructed according to the preferred embodiment of this invention, mounted on a vehicle which is shown in dotted line.

Figure 2 is an enlarged sectional view partly in detail showing the locking means for preventing release of the hood.

Figure 3 is a fragmentary enlarged top plan view of the connection between the operating rod and vertical lever.

Referring to the drawing wherein like characters of reference designate corresponding parts throughout the several views, the letter F designates generally a vehicle frame structure having a hood H associated therewith and disposed about the vehicle engine. In order to prevent unauthorized opening of the hood H, I have provided a locking means including a bar 10 which is riveted or otherwise secured, as at 13, to the inner surface of the hood H and preferably adjacent the central portion thereof so that only one of these bars 10 need be provided.

An inwardly extending lug or pin 11 is carried by the bar 10 adjacent the lower end thereof and this lug 11 is disposed below the upper edge of the channelled frame F. A locking lever, generally designated as 12, is pivotally mounted as at 14, to a substantially L-shaped bracket 15, which is carried by the frame F. This bracket 15 is provided with a cut out portion 16 adjacent the central and upper portions thereof within which the depending bar 10 is disposed.

The locking lever 12 is provided with a rearwardly extending locking lug 17 which engages the upper edge of the lug 11, so that when the lug 17 is engaged with the lug 11, the hood H cannot be lifted or moved laterally of the frame F. By disposing the lower end of the bar 10 below the frame F, the lower end of this bar 10 prevents lateral swinging movement of the hood H while the locking lug 17 prevents upward movement of the hood H.

In order to provide operating means for the locking lever 12, I have provided an operating rod 18 which extends through the forward wall 19 of the vehicle body and also extends through the dashboard or instrument board 20 and is provided at the inner end thereof with a knob or handle 21. The operating rod or member 18 is slidably disposed through a guide plate 22 carried by the instrument board 20 and this rod 18 is provided with a peripheral groove 23 within which a pivoted locking lever 24 carried by the guide plate 22 is adapted to seat, so as to prevent movement of the operating member 18 through the guide 22.

A pivoted lever 25 is carried by a bracket 26 secured to the bulkhead or forward wall 19 of the vehicle, the lever 25 being pivoted, as at 27, intermediate the ends thereof to this bracket arm 26. The operating rod or member 18 is pivotally connected to the lever 25 through the medium of an L-shaped member 28, which has one leg thereof pivoted, as at 29, to the upper end of the lever 25, and the other leg is pivotally secured, as at 30, to the inner end of the operating rod 18. In this manner, a substantially universal connection is provided between the operating member 18 and the lever 25.

The lower end of the lever 25 is connected through the medium of a link 31 to the locking lever 12 and the bracket 15 is provided with an arcuate slot 32 through which a headed pivotal member 33 passes, this pivotal member 33 also connecting the forward end of the link 31 to the lower end of the locking lever 12.

In the operation of this device, the locking member 24 is adapted to be swung upwardly through the medium of the lug 34 which extends outwardly therefrom so as to release this bar 24 from the peripheral groove 23. The knob 21 may then be pushed toward the instrument board 20 which will rock the lever 25 carrying the lower end thereof rearwardly and rocking the locking lever 12 so as to carry the upper rearwardly extending end portion 17 out of engagement with the inwardly extending pin or lug 11 carried by the depending bar 10. The hood H may then be lifted upwardly on the hinge structure, not shown.

It will be obvious, from the foregoing, that an exceedingly simple locking means has been provided through the medium of which the hood of a vehicle may be securely locked against unauthorized opening, this being accomplished through the locking of the doors of the vehicle so as to prevent operation of the operating member 18.

While I have shown the locking means disposed on only one side of the vehicle, it is, of course, understood that a similar locking means may be disposed on the opposite side of the vehicle for engagement with the opposite side of the hood and, if desired, may be operatively connected with the operating member 18 so as to move each of the locking means together.

It is, of course, understood that various changes and modifications may be made in the details of construction and design of the above specifically described embodiment of this invention without departing from the spirit thereof, such changes and modifications being restricted only by the scope of the following claim.

What is claimed is:—

A hood locking means comprising a locking member dependingly carried by the hood, means for securing the member to the inner surface of the hood, said member extending inwardly and downwardly of the upper edge of the vehicle frame whereby to prevent lateral swinging movement of the hood, an L-shaped bracket mounted on the vehicle frame having a slot to loosely receive the member, a locking lever pivotally carried by the bracket for engagement with said locking member, a second lever, bracket means engaging the vehicle and the lever to pivotally mount the second lever on the vehicle, a connecting link connecting one end of said second lever with the lower end of the first lever, an operating member, means for pivotally connecting the forward end of said operating member to the other end of said second lever, said bracket having a segmental slot to slidingly receive the pivot means for said operating member, the ends of the segmental slot limiting the movement of said locking lever and guide means engaging the vehicle for guiding said operating means.

ANTHONY T. TUFO.